United States Patent [19]
Haines

[11] Patent Number: 6,058,886
[45] Date of Patent: May 9, 2000

[54] PET CAGE DRYER

[75] Inventor: Michael Haines, Lenexa, Kans.

[73] Assignee: Schroer Manufacturing Company, Kansas City, Mo.

[21] Appl. No.: 09/140,026

[22] Filed: Aug. 26, 1998

[51] Int. Cl.$^7$ .................................................. A01K 13/00
[52] U.S. Cl. ........................................... 119/601; 119/606
[58] Field of Search ..................... 119/452, 448, 119/455, 500, 671, 606, 600, 601

[56] References Cited

U.S. PATENT DOCUMENTS

| Re. 30,266 | 5/1980 | Greene et al. ............................... 34/86 |
| Re. 33,638 | 7/1991 | Lilliston, Sr. et al. ................ 119/448 |
| 3,919,978 | 11/1975 | Schaeffer ............................... 119/500 |
| 4,043,256 | 8/1977 | Van Huis ............................... 454/238 |
| 4,173,947 | 11/1979 | Whiteside, Jr. ......................... 119/457 |
| 4,183,323 | 1/1980 | Maines .................................... 119/416 |
| 4,249,461 | 2/1981 | Christenson et al. .................. 454/269 |
| 4,343,261 | 8/1982 | Thomas .................................. 119/418 |
| 4,517,921 | 5/1985 | Haythornthwaite ..................... 119/448 |
| 4,526,133 | 7/1985 | Lo Maglio .............................. 119/419 |
| 4,528,941 | 7/1985 | Spengler ................................ 119/418 |
| 5,035,728 | 7/1991 | Fang .......................................... 96/19 |
| 5,036,797 | 8/1991 | Koozer ................................... 119/448 |
| 5,133,788 | 7/1992 | Backus ..................................... 55/467 |
| 5,213,059 | 5/1993 | Krantz ..................................... 119/419 |
| 5,435,269 | 7/1995 | Chen ...................................... 119/673 |
| 5,477,810 | 12/1995 | Wilkison, III et al. ................ 119/467 |
| 5,601,636 | 2/1997 | Glucksman ............................... 96/63 |
| 5,749,321 | 5/1998 | Ikuse et al. ............................. 119/458 |
| 5,761,915 | 6/1998 | Rao ............................................ 62/94 |

FOREIGN PATENT DOCUMENTS

| 331219 | 2/1989 | European Pat. Off. . |
| 340669 | 4/1989 | European Pat. Off. . |
| 2341251 | 9/1977 | France . |
| 70035213B | 9/1966 | Japan . |
| 363210543A | 9/1988 | Japan . |
| 401207661A | 8/1989 | Japan . |
| 405219855A | 8/1993 | Japan . |
| 10117625A | 10/1996 | Japan . |
| 7909039 | 12/1979 | Netherlands . |
| 1645780 | 4/1991 | U.S.S.R. . |
| 2095527 | 10/1982 | United Kingdom . |
| 2293532 | 4/1996 | United Kingdom . |

OTHER PUBLICATIONS

Dryers disclosed in New England Serum Company promotional materials entitled "Professional Dryers"—three unnumbered pages (date and place of publication unknown).

Dryers disclosed in Rapid Electric advertisement in *Groomer to Groomer* magazine entitled "Rapid Makes It!"—one unnumbered page (date and place of publication unknown).

Dryers disclosed in Doggie Products of America brochure entitled "The Pet Dryer"—two unnumbered pages (date and place of publication unknown).

Dryers disclosed in DRI–EAZ brochure entitled "Sahara Turbo Dryer"—three unnumbered pages (date and place of publication unknown).

Dryer disclosed in Snyder Mfg. Co. brochure entitled "Announcing the New Snyder Dryer"—two unnumbered pages (date and place of publication unknown).

Dryers disclosed in Edemco Dryers, Inc. brochure entitled "Edemco—The Professional's Choice"—three unnumbered pages (date and place of publication unknown).

(List continued on next page.)

*Primary Examiner*—Michael J. Carone
*Assistant Examiner*—Fredrick T. French, III
*Attorney, Agent, or Firm*—Stinson Mag & Fizzell, P.C.

[57] ABSTRACT

A pet cage dryer comprising a cage and a fan assembly mounted thereon for drying the wet coat of a pet animal housed inside the cage. In use, the fan assembly directs a high volume of ambient temperature air across substantially the entire interior region of the cage such that the air dries substantially every surface of the pet's coat at the same time. As a result, the pet cage dryer is able to dry the pet's coat in a relatively short period of time without the use of heated air and without any manual intervention on the part of a groomer during the drying process.

22 Claims, 5 Drawing Sheets

OTHER PUBLICATIONS

Dryers disclosed in Peggy s.n.c. di Antonio Dente & C. brochure entitled "PEGGY La Professionalità E L'assortimento Negli Articoli per La Toelettatura"—one unnumbered page (date and place of publication unknown). It is the understanding of the undersigned that this brochure discloses two stand dryers and one wall–mounted dryer.

Dryers disclosed in Burkhardt & Müller brochure entitled Product's of Burkhardt & Müller—four unnumbered pages (date and place of publication unknown). It is the understanding of the undersigned that this brochure discloses box–type dryers. An English translation of the product information corresponding to Fönboxautomat 1150, Fönboxautomat 1000, and Fönboxautomat 800 on the third page of the brochure is enclosed.

Applicant is aware that at least one other groomer has placed a house–type fan in front of a cage for the purpose of drying a pet animal housed inside the cage. Applicant has no knowledge of the earliest date of such a use.

PET CAGE DRYER

BACKGROUND OF THE INVENTION

1. Field of the Invention

The present invention generally relates to dryers for pet animals, and is more particularly directed to a pet dryer comprising a cage and a fan assembly mounted thereon for drying the wet coat of a pet animal housed inside the cage.

2. Description of the Related Art

Many types and breeds of pet animals, such as dogs and cats, require periodic grooming of the hair on the pet's coat to present a clean and well-groomed appearance. The process of grooming the pet typically includes the steps of shampooing the pet's coat, drying the pet's coat, trimming the hair of the pet's coat (if desired), and combing the loose hair from the pet's coat. In an effort to decrease the amount of time required to groom the pet, it is known to use a variety of different types of electric dryers to perform the step of drying the pet's coat.

For example, some groomers have been known to use a hand-held hair dryer (such as those commonly sold for use by people) to dry the pet's coat. Another type of manual dryer consists of a base unit having a flexible tube extending therefrom, wherein the base unit can be mounted on a grooming table, mounted on a wall near a grooming table, placed on the floor near a grooming table, or mounted on wheels so that the dryer can be pulled between grooming stations. Within the base unit is a motor-powered squirrel cage blower which operatively forces air through the flexible tube.

To use the above dryers, the groomer aims the hair dryer or flexible tube at a particular area of the pet's coat and dries that area, aims the hair dryer or flexible tube at a different area of the pet's coat and dries that area, and so on. The disadvantage of using these type of dryers is that the groomer must manually dry the pet's coat, thereby preventing him/her from performing other tasks during the drying process.

Therefore, to enable a groomer to perform other tasks during the drying process, various types of "cage" dryers have been designed which allow the groomer to place a shampooed pet inside a cage to dry the pet's coat.

For example, the base unit/flexible tube dryer described above is designed to optionally include a cage attachment which can be secured to the end of the flexible tube. In use, a shampooed pet is placed inside a cage, the end of the flexible tube is attached to the wire cage door, and the blower forces air through the tube and into the cage at a volumetric rate ranging from 100 to 300 cubic feet per minute.

Another type of cage dryer is a stand dryer. A stand dryer consists of a housing mounted on a vertical pole, wherein the pole is supported by a base mounted on wheels so that the dryer can be rolled between cages. Within the housing is a motor-powered squirrel cage blower which operatively forces air through a drying nozzle of the housing. In use, a shampooed pet is placed inside a cage, the stand dryer is positioned next to the wire cage door, and the blower forces air through the drying nozzle and into the cage at a volumetric rate ranging from 100 to 300 cubic feet per minute.

Yet another type of cage dryer is a hanging dryer. A hanging dryer consists of a housing having hooks attached thereto such that the dryer can be hung from the wire door of a cage. Within the housing is a motor-powered squirrel cage blower which operatively forces heated air through a rectangular vent on the front of the dryer. In use, a shampooed pet is placed inside a cage, the hanging dryer is hung on the wire cage door, and the blower forces heated air through the vent and into the cage at a volumetric rate ranging from 150 to 550 cubic feet per minute.

The disadvantage of using the above cage dryers is that the relatively small area of the dryer opening only directs enough air into the cage to dry a portion of the surface of the pet's coat at a time. Thus, the groomer may have to reposition the dryer in relation to the pet throughout the drying process, thereby requiring some manual intervention on the part of the groomer. In addition, some regions of the pet's coat (e.g. the side facing away from the dryer) will not be as dry as others. Furthermore, it is well known that pet animals left unattended in a heated cage can develop hypothermia (fatal overheating) and/or suffer dehydration as a result of the heat. Therefore, many groomers refuse to use heated cage dryers because of the potential health hazards to the pet.

In yet a further attempt to dry a pet animal, cage dryers have been designed which consist of a substantially enclosed cage having a motor-powered squirrel cage blower housed within a compartment inside the cage. In use, the blower circulates jets of heated air under the cage flooring and into the cage at a volumetric rate ranging from 500 to 1400 cubic feet per minute. The disadvantage of using these cage dryers is that they use heated air to dry the pet's coat. Therefore, many groomers also refuse to use these cage dryers because of the potential health hazards to the pet.

In view of the problems associated with the above dryers, it is an objective of the present invention to provide an improved pet dryer which does not require a groomer to manually dry a pet animal's coat, thereby allowing the groomer to perform other tasks during the drying process.

Another objective of the present invention is to provide a pet dryer which drys a pet animal's coat without any manual intervention on the part of a groomer during the drying process.

Another objective of the present invention is to provide a pet dryer which drys a pet animal's coat in a relatively short amount of time.

Yet another objective of the present invention is to provide a pet dryer which drys a pet animal's coat without the use of heated air.

SUMMARY OF THE INVENTION

These and other objectives are met by a pet cage dryer comprising a cage and a fan assembly mounted thereon for drying the wet coat of a pet animal housed inside the cage. In use, the fan assembly directs a high volume of ambient temperature air across substantially the entire interior region of the cage such that the air dries substantially every surface of the pet's coat at the same time. As a result, the pet cage dryer is able to dry a pet's coat without the use of heated air and in the same or shorter amount of time as that of lower air volume dryers which rely on heated air to reduce the drying time. In addition, the pet cage dryer is able to dry a pet animal's coat without any manual intervention on the part of a groomer during the drying process.

In a first preferred embodiment of the present invention, the pet cage dryer comprises a single cage having an interior region capable of housing a pet animal. A fan assembly is mounted on the cage such that the fan assembly substantially forms a wall of the cage. The fan assembly includes an axial air fan which comprises a relatively large portion of the surface area of the cage wall. The axial air fan operatively directs ambient temperature air across the interior region of the cage at a high volumetric rate, most preferably ranging from 4000 to 7000 cubic feet per minute. Thus, the high volume of air flowing across substantially the entire interior region of the cage dries substantially every surface of the pet's coat at the same time, thereby reducing the drying time.

In a second preferred embodiment of the present invention, the pet cage dryer comprises a large cage having an interior region capable of housing a medium to large size pet animal. The large cage optionally includes a divider for separating the large cage into two smaller cages wherein each smaller cage is capable of housing a small to medium size pet animal. The large cage includes two fan assemblies mounted thereon such that one fan assembly substantially forms the left side wall of the cage and the other fan assembly substantially forms the right side wall of the cage. Each of the fan assemblies operatively direct ambient temperature air transversely across the interior region of the large cage at a high volumetric rate, most preferably ranging from 4000 to 7000 cubic feet per minute per fan. Thus, the high volume of air flowing in opposing directions across substantially the entire interior region of the large cage dries substantially every surface of the pet's coat at the same time, thereby reducing the drying time.

In a third preferred embodiment of the present invention, the pet cage dryer comprises three individual cages—a large cage having an interior region capable of housing a medium to large size pet animal, and first and second smaller cages positioned side by side above the large cage wherein each of the smaller cages has an interior region capable of housing a small to medium size pet animal. The large cage optionally includes a divider for separating the large cage into two smaller cages wherein each smaller cage is capable of housing a small to medium size pet animal.

The lower large cage has the same configuration as the large cage of the second preferred embodiment, wherein one fan assembly substantially forms the left side wall of the cage and the other fan assembly substantially forms the right side wall of the cage. The fan assemblies operate in the same manner as the fan assemblies of the second preferred embodiment.

The upper smaller cages each have generally the same configuration as the cage of the first preferred embodiment, wherein one fan assembly substantially forms the left side wall of the first smaller cage and another fan assembly substantially forms the right side wall of the second smaller cage. Each of the fan assemblies operate in the same manner as the fan assembly of the first preferred embodiment.

The present invention will be better understood from the following detailed description of the first, second, and third preferred embodiments of the present invention, read in connection with the drawings as hereinafter described.

DETAILED DESCRIPTION OF THE INVENTION

First Preferred Embodiment

Figure 1:
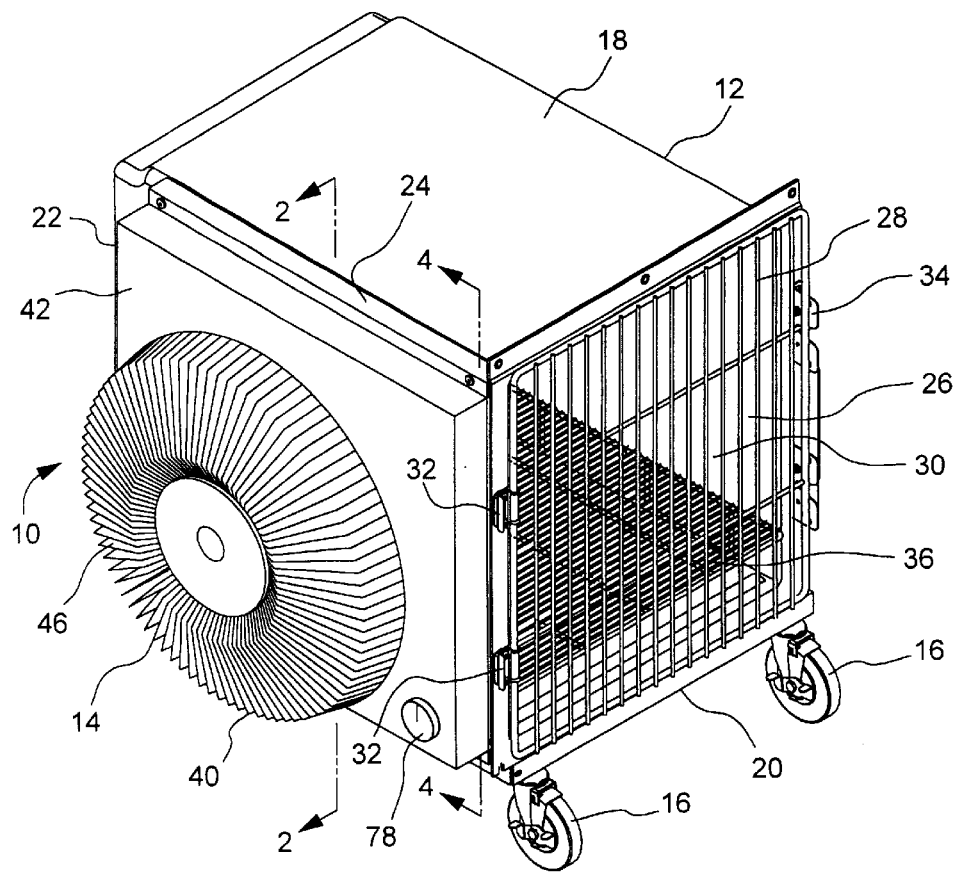
FIG. 1 is a perspective view of a pet cage dryer in accordance with a first preferred embodiment of the present invention.

Referring to FIG. 1, a pet cage dryer in accordance with a first preferred embodiment of the present invention is represented generally by the numeral 10. Pet cage dryer 10 comprises a cage 12 for housing a pet animal, and a fan assembly 14 mounted thereon for drying the wet coat of a pet animal housed inside cage 12. While pet cage dryer 10 could be either stationary or mobile, this embodiment includes a locking caster base 16 which enables pet cage dryer 10 to be moved about a groomer's facility.

Figure 3:
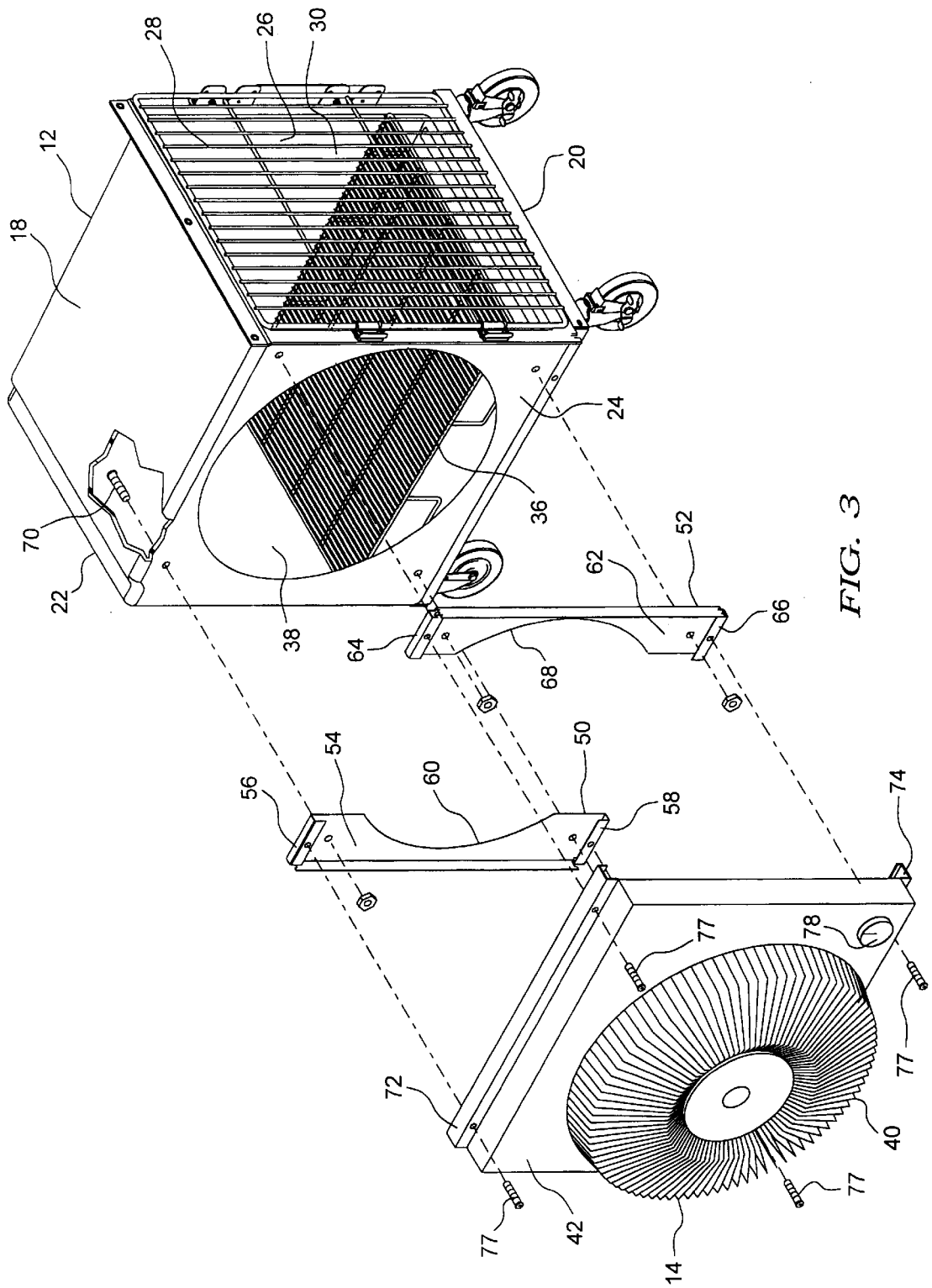
FIG. 3 is a partially exploded perspective view of the pet cage dryer of FIG. 1, showing the fan assembly and mounting brackets dismounted from the cage.

Referring to FIGS. 1 and 3, cage 12 consists of a top wall 18, a bottom wall 20, a rear wall 22, a left side wall 24, a right side wall 26, and a wire cage door 28, which together define an interior region 30 for housing a pet animal. Walls 18, 20, 22, 24, and 26 may be formed of any rigid material known in the art including plastic or steel, and are preferably formed of a moldable plastic such as polyethylene. Cage door 28 may also be formed of any rigid material known in the art, and is preferably formed of chrome-plated steel or stainless steel. Hinges 32 are provided for swingably mounting cage door 28 to the front edge of left side wall 24. As such, cage door 28 can be swung open to provide access to interior region 30 and closed to retain a pet animal inside interior region 30. A latch 34 is provided on the front edge of right side wall 26 for securing cage door 28 in the closed position.

Cage 12 includes a raised mesh floor 36 for supporting a pet animal housed inside cage 12. During the drying process, raised floor 36 enables air to flow underneath the pet animal so that the underside of the pet animal can be thoroughly dried. Raised floor 36 can be formed of any rigid material known in the art, and is preferably formed of PVC-coated steel.

Although cage 12 is similar to conventional cages for housing pet animals with respect to many of the features described hereinabove, cage 12 is different than those conventional cages in that left side wall 24 is not a solid wall. Referring specifically to FIG. 3, left side wall 24 has a circular opening 38 formed therein which is designed to correspond with the circular shape of an axial air fan 40 of fan assembly 14. Thus, when fan assembly 14 is mounted on left side wall 24 (which will be described in greater detail hereinbelow), axial air fan 40 covers opening 38 such that fan assembly 14 substantially forms the left side wall of cage 12. The opening and corresponding fan will comprise a relatively large portion of the surface area of the left side wall, preferably comprising at least 30% of the surface area of the left side wall, more preferably comprising at least 40% of the surface area of the left side wall, and most preferably comprising at least 55% of the surface area of the left side wall. For example, in a cage designed to house a small to medium size pet animal, pet cage dryer 10 may have a left side wall that is approximately 30 inches tall and 29 inches wide, wherein the opening and corresponding fan may have a diameter that is approximately 23 inches. In this manner, the air flow from fan 40 is directed transversely across substantially the entire interior region 30 of cage 12.

Figure 2:
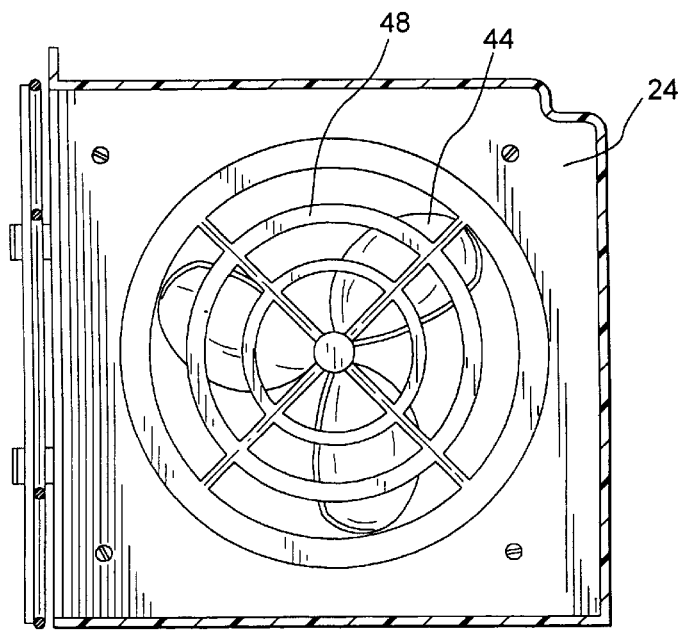
FIG. 2 is a sectional view taken along line 2—2 of the pet cage dryer of FIG. 1, showing the fan assembly as seen from the interior region of the cage.

Referring to FIGS. 1 and 2, fan assembly 14 may comprise any conventional high volume fan, such as a window fan or an attic fan. Preferably, fan assembly 14 consists of a generally square-shaped fan body 42 having axial air fan 40 secured therein. Axial air fan 40 consists of a motor-powered three-blade impeller 44 which operatively rotates to direct a high volume of air across interior region 30, wherein impeller 44 is surrounded by outside and inside safety grills 46 and 48 which prevent a groomer and/or a pet animal from contacting rotating impeller 44.

Figure 4:
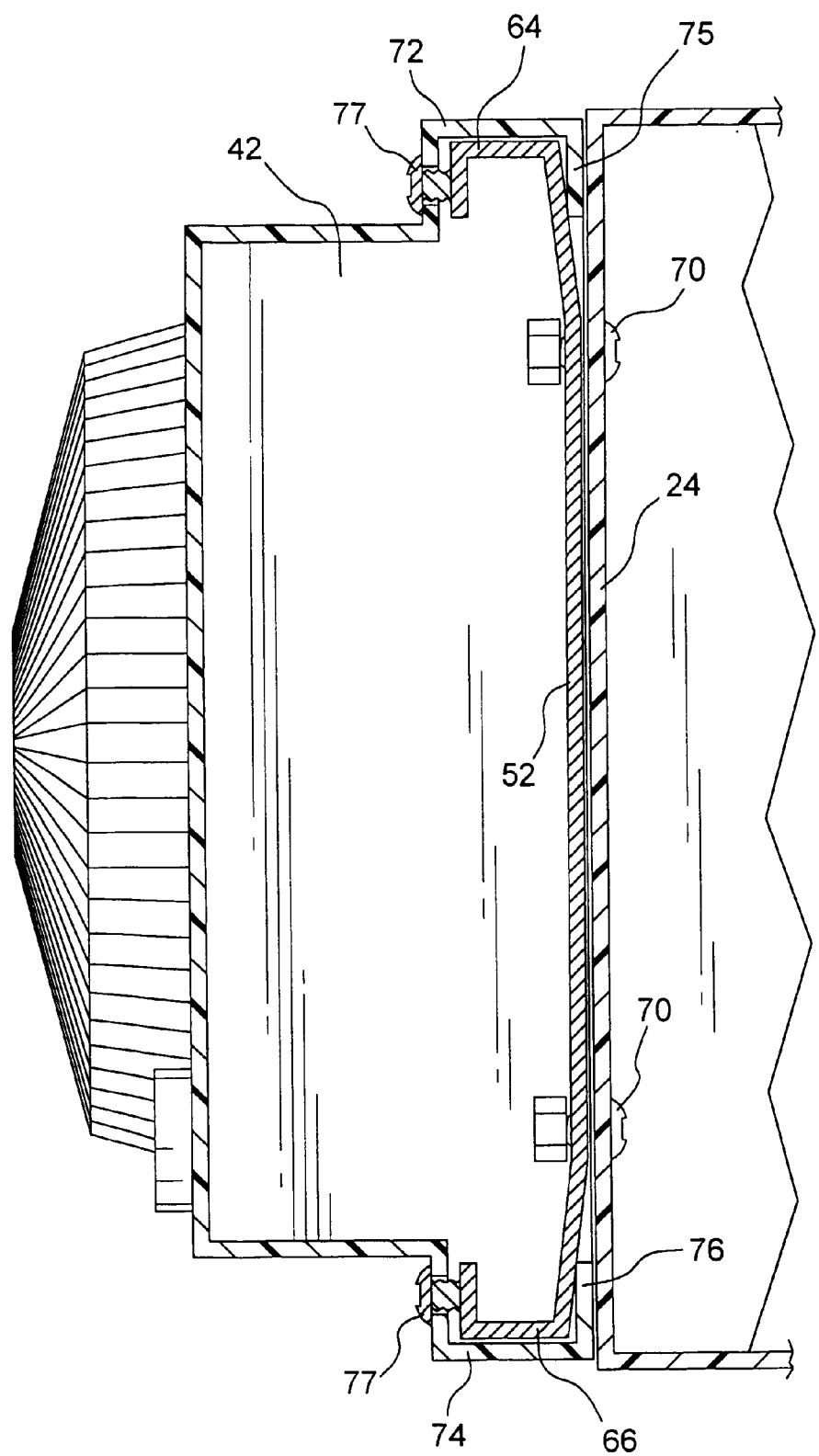
FIG. 4 is a sectional view taken along line 4—4 of the left side of the pet cage dryer of FIG. 1, showing the mounting brackets and fan assembly mounted on the cage.

Referring to FIGS. 3 and 4, a pair of mounting brackets 50 and 52 are provided to mount fan assembly 14 on left side wall 24. Mounting bracket 50 consists of a generally planar bracket body 54 having an upper U-channel 56 and a lower U-channel 58 projecting away from cage 12. Bracket body 54 has a curvilinear right edge 60 which corresponds with circular opening 38. Similarly, mounting bracket 52 consists of a generally planar bracket body 62 having an upper U-channel 64 and a lower U-channel 66 projecting away from cage 12. Bracket body 62 has a curvilinear left edge 68 which corresponds with circular opening 38. Screws 70 are provided for securing mounting brackets 50 and 52 to left side wall 24. Mounting brackets 50 and 52 may be formed of any pliable rigid material known in the art, and is preferably formed of stainless steel.

Fan body 42 has an upper U-channel 72 and a lower U-channel 74 projecting toward cage 12, wherein upper U-channel 72 can be mounted over corresponding upper U-channels 56 and 64 of mounting brackets 50 and 52, and lower U-channel 74 can be mounted over corresponding lower U-channels 58 and 66 of mounting brackets 50 and 52. The inner face 75 and 76 of each U-channel 72 and 74 is therefore sandwiched between mounting brackets 50 and 52 and left side wall 24. Screws 77 are provided which abut against mounting brackets 50 and 52 for securing fan body 42 to mounting brackets 50 and 52. Of course, any other conventional means of mounting fan assembly 14 on cage 12 could also be employed in accordance with the present invention.

Although the drawings depict fan assembly 14 mounted on left side wall 24, it is to be understood that fan assembly 14 could also be mounted on top wall 18, rear wall 22, or right side wall 26. It is noted, however, that if fan assembly 14 were mounted on top wall 18, it would be difficult to dry the underside of the pet animal. Fan assembly 14 should not be mounted on bottom wall 20 insofar as there would be problems with water getting on the fan and/or pet animals urinating on the fan.

The most preferable embodiment is to mount fan assembly 14 on a side wall so that the air flow will be directed toward the opposing side wall, thereby hitting the opposing side wall and creating more turbulent air flow in interior region 30. This turbulence will lift the pet's coat and remove loose hair from the pet's undercoat. As such, the pet cage dryer is able to remove some of the loose hair that a groomer would otherwise have to remove during the combing step of the grooming process.

Referring again to FIG. 1, fan assembly 14 includes a switch 78 to control the operation of axial air fan 40. In use, fan 40 directs ambient temperature air transversely across interior region 30 at a volumetric rate greater than 2500 cubic feet per minute, preferably greater than 3000 cubic feet per minute, and most preferably greater than 4000 cubic feet per minute.

It should be understood that the volumetric rate necessary to dry a pet housed inside cage 12 is proportional to the volume of interior region 30. In a typical cage sized for housing pets, the volume of interior region 30 will generally range from 8 to 25 cubic feet and fan 40 will direct air across interior region 30 at a volumetric rate generally ranging from 2500 to 10,000 cubic feet per minute. Preferably, the volume of interior region 30 will range from 10 to 20 cubic feet and fan 40 will direct air across interior region 30 at a volumetric rate ranging from 3000 to 8000 cubic feet per minute. Most preferably, the volume of interior region 30 will range from 12 to 15 cubic feet and fan 40 will direct air across interior region 30 at a volumetric rate ranging from 4000 to 7000 cubic feet per minute. Of course, for larger cages, fan 40 could also use multiple fans as in the second preferred embodiment of the present invention described hereinbelow.

Thus, the pet cage dryer of the present invention directs a high volume of ambient temperature air across substantially the entire interior region of the cage to dry substantially every surface of the pet animal's coat at the same time. As a result, the pet cage dryer is able to dry the pet animal's coat in a relatively short period of time without the use of heated air and without any manual intervention on the part of a groomer during the drying process.

Second Preferred Embodiment

Figure 5:
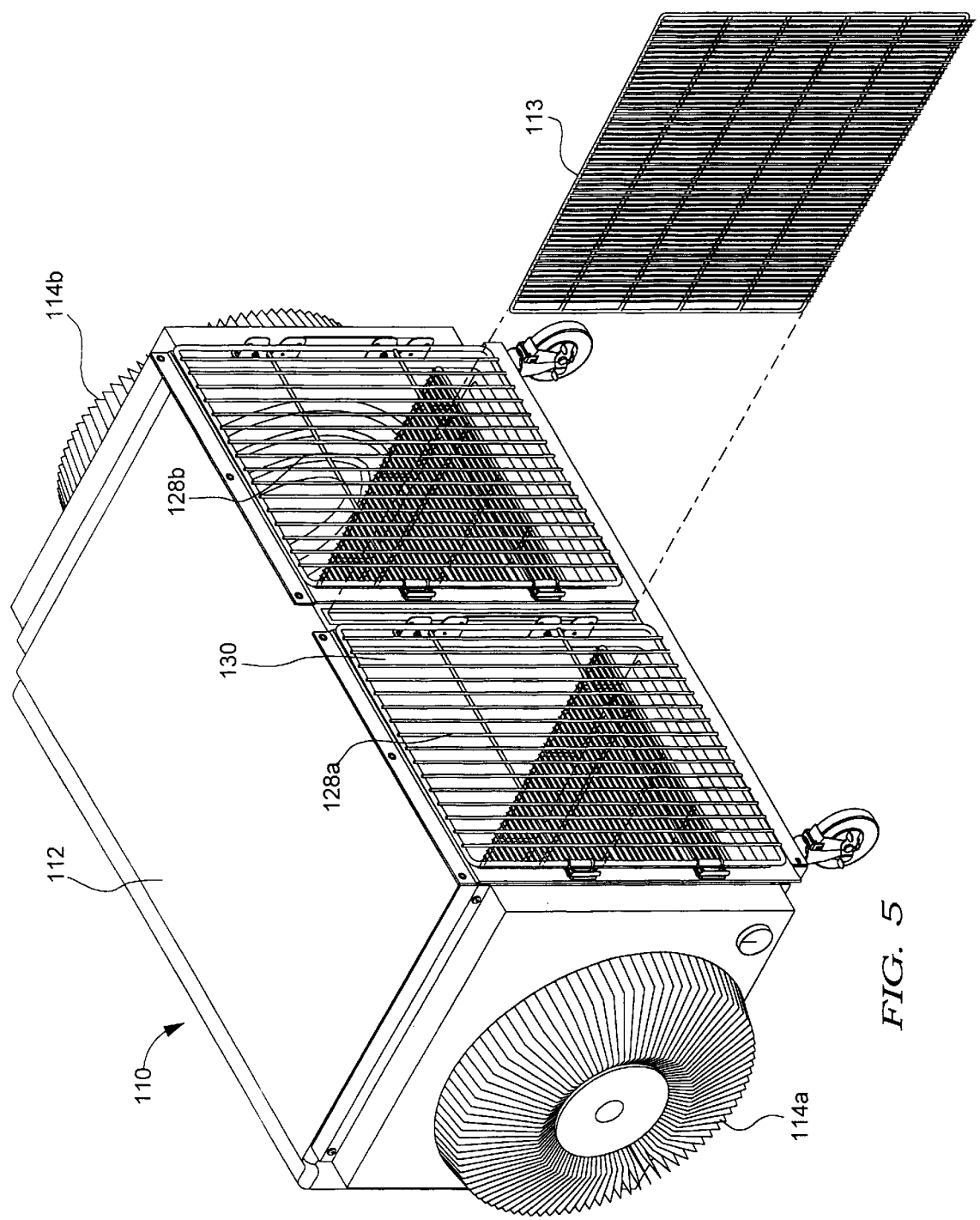
FIG. 5 is a perspective view of a large pet cage dryer in accordance with a second preferred embodiment of the present invention.

Referring to FIG. 5, a pet cage dryer in accordance with a second preferred embodiment of the present invention is represented generally by the numeral 110. Pet cage dryer 110 comprises a large cage 112 having an interior region 130 capable of housing a medium to large size pet animal. Large cage 112 optionally includes a solid or mesh divider 113 for separating large cage 112 into two smaller cages wherein each smaller cage is capable of housing a small to medium size pet animal.

Large cage 112 has a similar configuration to cage 12 of the first preferred embodiment, with the exception that large cage 112 is significantly wider to hold a larger dog, has two wire cage doors 128a and 128b, and includes two fan assemblies 114a and 114b mounted thereon. Fan assembly 114a substantially forms the left side wall of cage 112 and fan assembly 114b substantially forms the right side wall of cage 112, as in the first preferred embodiment.

Fan assemblies 114a and 114b operate in the same manner as fan assembly 14 of the first preferred embodiment, wherein fan assemblies 114a and 114b each direct a high volume of ambient temperature air transversely across interior region 130 of cage 112. Thus, the high volume of air flowing in opposing directions across substantially the entire interior region 130 of cage 112 dries substantially every surface of the pet animal's coat at the same time, thereby reducing the drying time. In addition, even though the air flowing across interior region 130 does not hit an opposing side wall as in the first preferred embodiment, the opposing air flow from fan assemblies 114a and 114b creates turbulence which will remove some of the loose hair that a groomer would otherwise have to remove during the combing step of the grooming process.

Third Preferred Embodiment

Figure 6:
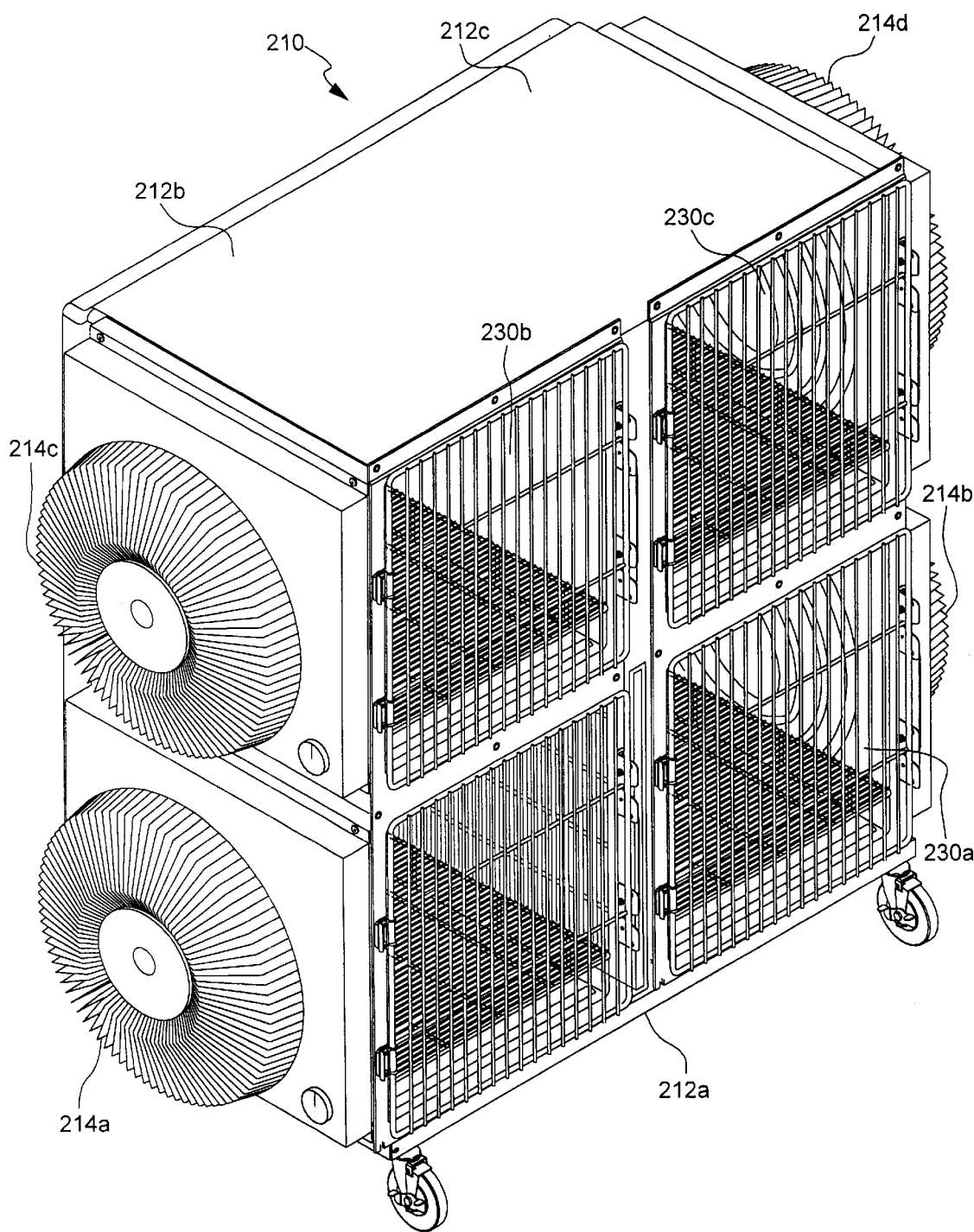
FIG. 6 is a perspective view of a multiple pet cage dryer in accordance with a third preferred embodiment of the present invention.

Referring to FIG. 6, a pet cage dryer in accordance with a third preferred embodiment of the present invention is represented generally by the numeral 210. Pet cage dryer 210 comprises three individual cages—a large cage 212a having an interior region 230a capable of housing a medium to large size pet animal (which optionally includes a divider as in the second preferred embodiment), and first and second smaller cages 212b and 212c positioned side by side above large cage 212a wherein smaller cages 212b and 212c each have an interior region 230b and 230c capable of housing a small to medium size pet animal.

Large cage 212a has the same configuration as cage 112 of the second preferred embodiment, wherein a first fan assembly 214a substantially forms the left side wall of cage 212a and a second fan assembly 214b substantially forms the right side wall of cage 212a. Fan assemblies 214a and 214b operate in the same manner as fan assemblies 114a and 114b of the second preferred embodiment.

Smaller cages 212b and 212c each have generally the same configuration as cage 12 of the first preferred embodiment, wherein a fan assembly 214c substantially forms the left side wall of cage 212b and a fan assembly 214d substantially form the right side wall of cage 212c. Fan assemblies 214c and 214d operate in the same manner as fan assembly 14 of the first embodiment.

It is to be understood that smaller cages 212b and 212c could be replaced by a large cage having the same configuration as large cage 212a, and, conversely, large cage 212a could be replaced by two smaller cages having the same configuration as smaller cages 212b and 212c. In addition, any of the cages (such as smaller cages 212b and 212c) could be configured without a fan assembly mounted thereon such that the cage could be used as a conventional holding cage.

Although the pet cage dryer of the present invention has been described and illustrated with regard to specific embodiments, it should be understood that various modifications of the pet cage dryer are possible without departing from the scope of the present invention. Therefore, the present invention is not to be limited to the specific structure or arrangement of parts described and illustrated hereinabove, except insofar as such elements and/or limitations are included in the following claims.

What is claimed is:

1. A pet cage dryer for drying a wet coat of a pet animal housed within the cage dryer, said dryer comprising:
 (a) at least one cage having an interior region for a pet animal; and
 (b) at least one fan assembly mounted on said cage, wherein said fan assembly operatively directs ambient temperature air into the cage at a sufficiently high volumetric rate to create turbulent airflow within substantially the entire region of said cage to dry said pet animal's coat.

2. The pet cage dryer of claim 1 wherein said fan assembly substantially forms a wall of said cage.

3. The pet cage dryer of claim 2 wherein said fan assembly substantially forms a side wall of said cage such that said fan assembly directs said air transversely across said substantially entire interior region of said cage.

4. The pet cage dryer of claim 2 wherein said fan assembly includes an axial air fan for directing said air across said substantially entire interior region of said cage.

5. The pet cage dryer of claim 4 wherein said axial air fan comprises at least 30% of said wall of said cage.

6. The pet cage dryer of claim 1 wherein said fan assembly directs air across said substantially entire interior region of said cage at a volumetric rate of at least 2500 cubic feet per minute.

7. The pet cage dryer of claim 1 wherein said interior region has a volume ranging from 8 to 25 cubic feet, and wherein said fan assembly directs said air across said substantially entire interior region of said cage at a volumetric rate ranging from 2500 to 10,000 cubic feet per minute.

8. The pet cage dryer of claim 1 wherein said fan assembly dries said animal's coat without the use of heated air.

9. The pet cage dryer of claim 1 further comprising means for mounting said fan assembly on said cage.

10. The pet cage dryer of claim 1 comprising at least two fan assemblies mounted on said cage such that said fan assemblies substantially form opposing side walls of said cage, wherein said fan assemblies operatively direct air in opposing directions across said substantially entire interior region of said cage to dry said pet animal's coat.

11. A pet cage dryer for drying a wet coat of a pet animal comprising:
 at least one cage having an interior region for housing a pet animal; and
 at least one fan assembly mounted on said cage such that said fan assembly substantially forms a wall of said cage,
 said interior region of said cage having a volume ranging from 8 to 25 cubic feet, wherein said fan assembly operatively directs air into the entire interior region of said cage at a volumetric rate of at least 2500 cubic feet per minute.

12. The pet cage dryer of claim 11 further including a base operable to provide mobility, wherein said base includes at least two casters.

13. The pet cage dryer of claim 11 wherein said at least one fan assembly comprises at least two fan assemblies such that said fan assemblies substantially form opposing side walls of said cage, wherein said fan assemblies operatively direct a volumetric flow of ambient temperature air in opposing directions across said substantially entire interior region of said cage whereby each of said air flow interact to redirect the opposing airflow thereby causing turbulent airflow.

14. A pet cage dryer for drying a wet coat of a pet animal housed within the cage dryer, said dryer comprising:
 (a) at least one cage having an interior region for housing a pet animal, said interior region being defined by a top wall, a bottom wall and a plurality of sidewalls; and
 (b) at least one fan assembly mounted on at least one of said sidewalls for directing a volumetric flow of air into and transversely across the interior region of said cage toward an opposing sidewall of said cage in such a manner as to create turbulent airflow within substantially the entire region of said cage to dry said pet animal's coat.

15. The pet cage dryer of claim 14 wherein said fan assembly directs a volumetric flow of ambient temperature air into the interior region of said cage such that the pet animal's coat is dried without the need for heated air.

16. The pet cage dryer of claim 14 wherein said fan assembly comprises an axial air fan for directing said ambient temperature air across said interior region of said cage.

17. The pet cage dryer of claim 16 wherein said axial air fan comprises at least 30% of said said wall of said cage.

18. The pet cage dryer of claim 14 wherein said fan assembly directs said ambient temperature air across said substantially entire interior region of said cage at a volumetric rate of at least 4000 cubic feet per minute.

19. The pet cage dryer of claim 14 wherein said interior region has a volume ranging from 12 to 15 cubic feet, and wherein said fan assembly directs said air across said substantially entire interior region of said cage at a volumetric rate ranging from 4000 to 7000 cubic feet per minute.

20. The pet cage dryer of claim 14 wherein said axial fan comprises at least 55% of said sidewall of said cage.

21. A pet cage dryer in accordance with claim 14, wherein said opposing sidewall, comprises a solid wall such that the flow of air will hit the opposing sidewall and be re-directed within the cage to create a turbulent flow air.

22. A pet cage dryer in accordance with claim 14, wherein at least one opposing fan assembly is mounted on said opposing sidewall to operatively direct a volumetric flow of air into and transversely across said interior region of the cage toward said at least one fan assembly, such that the fan assemblies are directing airflow in opposing directions toward one another thereby creating a turbulent flow air within substantially the entire region of said cage.

* * * * *

UNITED STATES PATENT AND TRADEMARK OFFICE
CERTIFICATE OF CORRECTION

PATENT : 6,058,886
DATED : May 9, 2000
INVENTOR(S) : Michael Haines

It is certified that error appears in the above-identified patent and that said Letters Patent is hereby corrected as shown below:

In Column 7, line 34, of the Patent, add "housing" between "for" and "a".

In Column 7, line 54, of the Patent, add "said" between "directs" and "air".

In Column 7, line 64, of the Patent, add "pet" between "said" and "animal's".

In Column 8, line 28, of the Patent, change "flow" to --flows--.

UNITED STATES PATENT AND TRADEMARK OFFICE
CERTIFICATE OF CORRECTION

PATENT : 6,058,886
DATED : May 9, 2000
INVENTOR(S): Michael Haines

It is certified that error appears in the above-identified patent and that said Letters Patent is hereby corrected as shown below:

In Column 8, line 29, of the Patent, add "increased" between "causing" and "turbulent".

In Column 8, line 52, of the Patent, change "wall" to --sidewall--.

In Column 8, line 65, of the Patent, delete "," between "sidewall" and "comprises".

In Column 10, line 2, of the Patent, add "of" between "flow" and "air".

Signed and Sealed this

Twenty-fourth Day of April, 2001

*Attest:*

NICHOLAS P. GODICI

*Attesting Officer*  *Acting Director of the United States Patent and Trademark Office*